United States Patent [19]

Krass

[11] Patent Number: 5,145,376

[45] Date of Patent: Sep. 8, 1992

[54] TEACHING AID FOR FOREIGN LANGUAGE

[76] Inventor: Jennifer M. Krass, 1318 E. Indian Mound, Birmingham, Mich. 48010

[21] Appl. No.: 664,127

[22] Filed: Mar. 4, 1991

[51] Int. Cl.⁵ ............................................. G09B 19/06
[52] U.S. Cl. ...................................... 434/157; 434/181
[58] Field of Search .................. 380/54; 273/8 N, 8.5; 434/157, 181

[56] References Cited

U.S. PATENT DOCUMENTS

| | | | |
|---|---|---|---|
| 598,537 | 2/1898 | Rosenzweig | 272/8 N |
| 2,952,080 | 9/1960 | Avakian et al. | 380/54 |
| 3,126,647 | 4/1964 | Haselett . | |
| 3,287,825 | 11/1966 | Ryan et al. | 380/54 |
| 4,067,122 | 1/1978 | Fernandez et al. | 434/157 |
| 4,177,578 | 12/1979 | Yamamoto | 434/157 |
| 4,734,036 | 3/1988 | Kasha | 434/157 |
| 4,891,011 | 7/1988 | Cook | 434/157 |

FOREIGN PATENT DOCUMENTS

| | | | |
|---|---|---|---|
| 363010 | 8/1962 | Switzerland . | |
| 2235081 | 2/1991 | United Kingdom | 434/181 |

*Primary Examiner*—Gene Mancene
*Assistant Examiner*—L. Thomas
*Attorney, Agent, or Firm*—Krass & Young

[57] ABSTRACT

Apparatus for assisting the learning of a foreign language employs a text in the foreign language printed with an ink which reflects part of the visual spectrum, such as red ink. Superimposed on that foreign language text is a literal translation of the text in a language familiar to the reader, imprinted in an ink which reflects a different portion of the visual spectrum, such as blue ink. A student reads the text using eyeglasses which have lens coated with filters so that the lower portions, through which the student normally reads the text, pass light reflected from the foreign language text, rendering it visible to the reader, and block light reflected from the familiar language translation, rendering it invisible to the reader. When the reader's gaze is shifted, in the manner of use of bi-focal glasses, to observe the text through the upper sections of the filter, the translation is visible. In an alternate embodiment of the invention, the filter may be incorporated in a book mark having two longitudinally aligned sections incorporating the different filter materials.

5 Claims, 2 Drawing Sheets

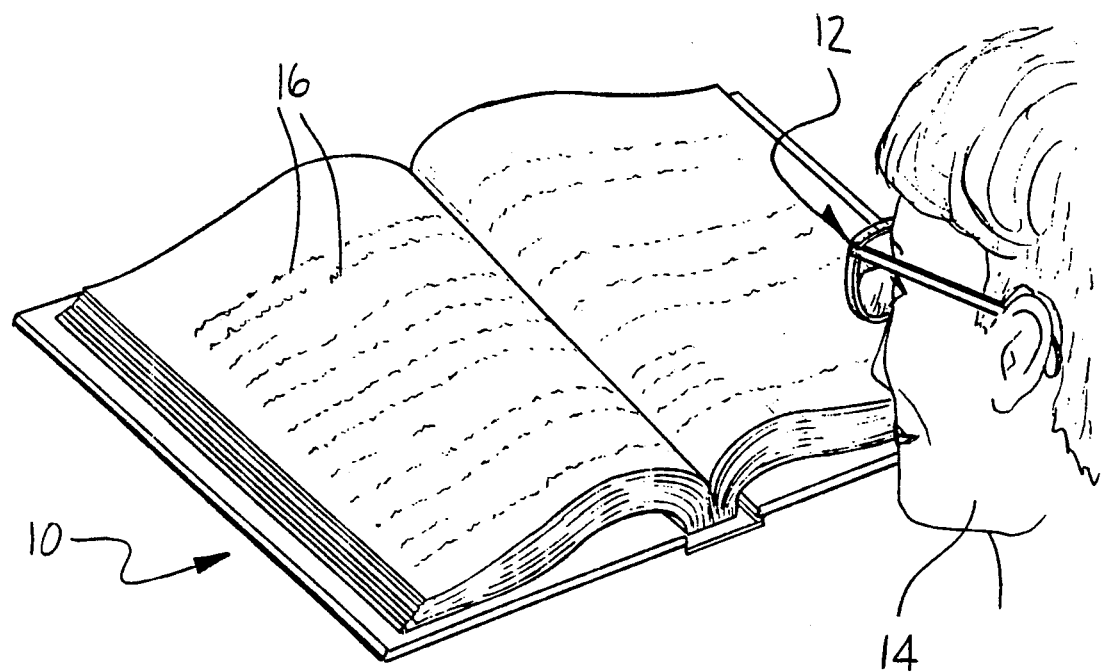
FIG - 1
FIG - 2
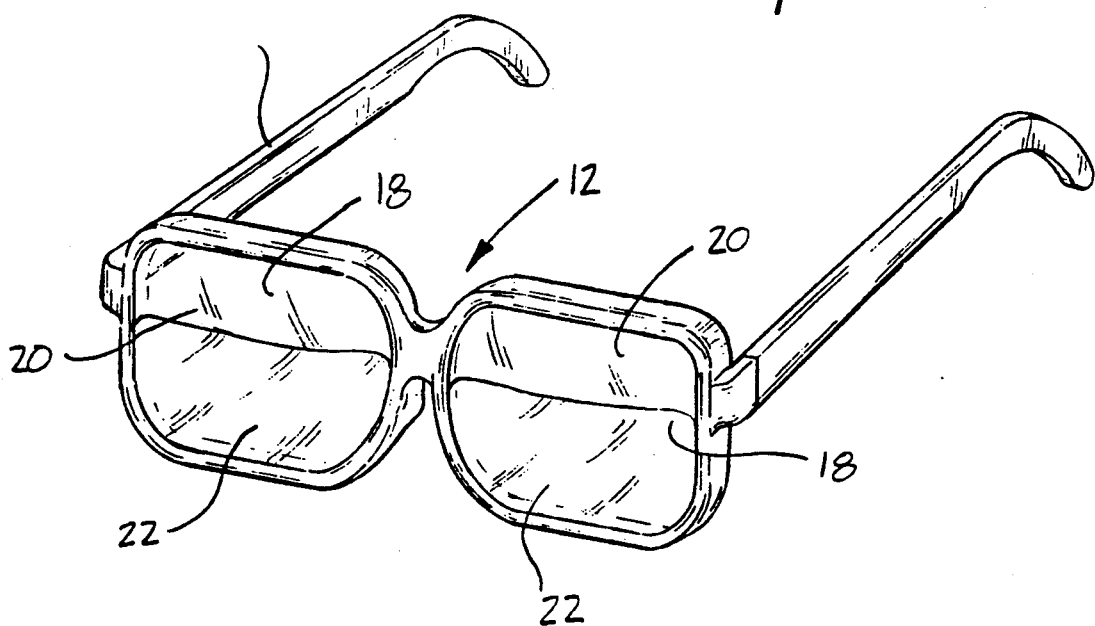

TEACHING AID FOR FOREIGN LANGUAGE

FIELD OF THE INVENTION

This invention relates to apparatus useful in the teaching of a foreign language comprising a media imprinted with both a foreign language text and a familiar language translation of that text positioned closely to one another, and filter means to render either the text or its translation visible to a reader.

BACKGROUND OF THE INVENTION

A simple and effective method for learning a foreign language is to read entertaining literature in that language. However, the need to constantly refer to a dictionary often makes what should be an enjoyable experience tedious, thus discouraging the reader.

One solution to this problem involves printing the foreign language text and its familiar language translation on opposing pages of a book so that quick reference may be had to the translation. This has been implemented in prayer books and the like but the relatively extensive eye movement required to refer to the translation interrupts the reading of the foreign language text sufficiently to destroy the flow of the reading process.

Alternatively, it has been proposed to print the familiar language translation and a foreign language text directly adjacent to one another, effectively interleafing lines of the foreign and the familiar text. U.S. Pat. No. 3,126,647 discloses this type of arrangement in which the familiar text is printed in such small size type as to be unreadable to the normal unaided eye. When the familiar language translation of a word in the foreign text is required, a hand magnifying glass is brought into position over the translation, rendering it visible. Similarly, U.S. Pat. No. 4,891,011 discloses a system in which a familiar language translation is printed directly beneath the foreign language text using a medium which is generally invisible to the human eye unless exposed to light of a specified frequency range, such as ultraviolet light. The reader is provided with a portable light source of the specified frequency which may be used to illuminate the translation when required.

These arrangements require that the lines of the foreign text be spaced relatively widely from one another, and require the reader to move the device which will reveal the foreign language into position over the text.

Swiss Patent 363010 suggests overprinting the familiar and foreign texts using inks of different colors and employing a sheet of the same size as the book incorporating a series of two-color filters which may be positioned over the text so as to reveal either the foreign text or its familiar language translation to the student. This apparatus eliminates the need for the student to shift his gaze when referring to the translation of an unfamiliar word or phrase, but it is difficult to shift this overlay so as to reveal the desired text line and the delay required to manually shift the large sheet incorporating the filters to the required position interrupts the flow of reading the foreign text.

SUMMARY OF THE INVENTION

The present invention is directed to apparatus of this general type which is simple in construction and allows reference to the translation in such a simple manner as to avoid interrupting the reading of the foreign text to an inconvenient degree.

The present invention broadly involves pages of a media imprinted with foreign language text in a first colored ink and the translation of that text in a different colored ink and the use of a two-colored filter that may be interposed between the reader and the text.

The two-colored filter is preferably formed as the lenses of eyeglasses. The lower section, through which the viewer normally gazes, is tinted a color complementary to the ink with which the foreign text is imprinted, rendering the foreign text visible and the translation invisible. When the viewer shifts his gaze upwardly through the complementary colored sections of the filters forming each lens of the eyeglass, the translation is rendered visible.

The reader wearing these special glasses may thus refer to the translation of a difficult word or phrase without shifting his gaze and without the need to manually adjust a filter. This encourages the reader toward relying on the foreign text and produces a rapid acclamation to the foreign language.

Alternatively, the filter may be formed as a bookmark having a length similar to the length of the text lines and a relatively narrow width. The bookmark is transparent and the upper halve is tinted a color that will reveal one overprinted text and hide the other, and the lower halve is tinted the complementary color to reveal the other overprinted text. The bookmark is shifted on a line-by-line basis as the reader progressed through the text and may be shifted over a line to reveal the translation where required.

DETAILED DESCRIPTION OF THE DRAWINGS

Other objectives, advantages and applications of the present invention will be made apparent by reference to the accompanying drawings, in which:

FIG. 1 is a perspective view of a student employing the preferred form of apparatus of the present invention to study a foreign language text with a familiar language translation;

FIG. 2 is a perspective drawing of the bi-colored eyeglasses forming part of the apparatus of the preferred embodiment of the invention;

DETAILED DESCRIPTION OF THE INVENTION

Figures 3, 4, 5, 6, 7:
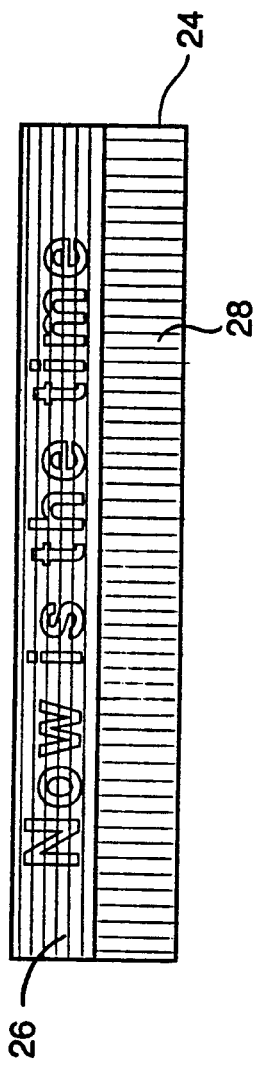
FIG. 3 illustrates a single line of the multiple line text forming part of the preferred embodiment of the apparatus as it would be viewed in white light, without the aid of the filter member of the present invention.
FIG. 4 illustrates the line of text of FIG. 3 as the student would normally view it through the bi-colored eyeglasses of FIG. 2 to reveal a foreign language text substantially unobscured by the translation text.
FIG. 5 is an illustration of the line of FIG. 3 as a student wearing the eyeglasses of FIG. 2 would view the line of FIG. 3 to reveal the familiar language translation of the foreign language text.
FIG. 6 is an illustration of an alternate form of the text of the present invention wherein the familiar language translation is printed below and immediately adjacent to the foreign language text.
FIG. 7 illustrates an alternative form of filter for use with the present invention.

Referring to FIG. 1 the preferred form of the present invention takes the form of a book, generally indicated at 10, and special eyeglasses, generally indicated at 12, to be worn by a student 14 when reading the book 10. It should be understood that other forms of printed media, other than a book, may be used in connection with the present invention. For example, single sheets, imprinted cards or the like may be employed as an alternative to the book 10.

The book 10 is imprinted with sequential lines of text 16 representing a novel, essay or other reading material chosen to be of interest to the student and a single line of text, as it would be viewed in normal light without the aid of the eyeglasses 12, is illustrated in FIG. 3. As thus illustrated, the line is difficult to read because it consists of a single phrase imprinted in two languages superimposed on one another. FIG. 4 illustrates the phrase as imprinted in one of the languages, and FIG. 5 illustrates the phrase in a different language. The user of the apparatus should be familiar with one of the two languages; normally it would be the student's native language. The apparatus of the present invention is used to improve the reading fluency of the student in the other language, which will be termed the "foreign" language. For the purpose of understanding the embodiments of the invention illustrated in the drawings, the assumption is made that the foreign language is English, as illustrated in FIG. 4, and the familiar language is Spanish as illustrated in FIG. 5. In this form the apparatus of the invention would be used to assist a student who is familiar with Spanish to read English.

In the embodiment of FIGS. 1-5, the foreign language text of FIG. 4 is imprinted with ink of a particular color, preferably one of the primary colors, i.e, red, blue or green. The familiar language translation, which is preferably a word-for-word translation but may alternatively be a higher level translation such as phrase-by-phrase or the like, is imprinted in ink of a different color than that used to print the foreign language, preferably one of the other primary colors. For example, if the foreign text is imprinted in blue, the familiar language text may be imprinted in red.

The student reads the line 16 of text through a filter. In the embodiment of FIG. 1 the filter consists of the eyeglasses 12 which are illustrated in detail in FIG. 2. The eyeglasses consist of lenses 18 supported in frames 20. Normally the lenses 18 will not provide any optical power, although prescription lenses could be employed by students who require optical correction to read.

The lenses 18 are divided into upper sections 20, which are tinted a first color, and lower sections 22 which are tinted a second color. Preferably the upper sections 20 take up the upper half of each lens and the lower sections 22 take up the lower half in the same manner as bifocal lenses.

The upper sections of the lenses 20 are tinted in a color that is complementary to the color of the ink in which the familiar language, FIG. 5, is imprinted and preferably the same color as the foreign language text of FIG. 4 is imprinted. Because of that coloring, the reader, viewing the text lines through the upper sections 20, will be able to see the foreign language text but the familiar language text will be hidden.

The lower sections 22 of the lenses are preferably tinted the same color as the foreign language text, and of a color complementary to the familiar language text. Thus, when the student 14 lowers his head so as to view a particular line 16 of the text through the upper tinted sections 20 of the eyeglasses 12, the familiar language text of FIG. 5 will be visible and the foreign language text will be hidden. In use, the reader 14 simply reads the text in the foreign language on a line-by-line basis by viewing it through the lower sections 22 of the lenses and may easily find the translation of any word or phrase which is not understood by simply maintaining his gaze on the line of text and lowering his head so that the line of view is shifted through the upper sections 20 of the eyeglasses, revealing the translation. Because there is no need for the student to shift his gaze to another place for the translation and then reposition his gaze back to the foreign language text, there is minimal interruption in the reading flow, encouraging the reader to continue with the foreign language text.

FIG. 6 illustrates an alternative form of printing the text. Rather than superimposing the familiar language text and the foreign language text, they may be imprinted immediately adjacent to one another. FIG. 6 illustrates two lines 30 and 32 of the foreign language text, with word-for-word translations in the familiar language text imprinted immediately below them at 34 and 36, respectively. This embodiment provides the advantage of eliminating any over-printing which may obscure one of the texts of the embodiment of FIG. 1 but requires a slight shifting in the gaze of the student to refer to a familiar language translation of the foreign language text. In the practice of this embodiment of the invention the upper section 20 of the lenses 18 may be plain, untinted glass so that when the student 14 lowers his head so as to view the translation he may also observe the foreign language text.

FIG. 7 illustrates an alternative embodiment of the invention wherein the filter takes the form of a bookmark 24, preferably having a length about equal to the width of a page of the book 10 and having a width equal to about the space of two lines of text.

The bookmark 24 is divided into an upper longitudinal section 26 and a lower longitudinal section 28. The section 26 is transparent and is tinted the same color as the upper lens sections 20 of the eyeglasses of FIG. 2 while the lower section 28 of the bookmark 24 is transparent and tinted in the same manner as the lower section 22 of the eyeglasses.

The reader uses the bookmark 24 by placing the upper section 26 over a line of the text and reading the line through the upper tinted section 26. The user moves the bookmark as successive lines of text are completed. In order to view the translation in the familiar language, the bookmark is shifted upward with respect to the line 16 so that the line 16 is visible through the lower tinted section 28, rendering the familiar language text visible without interference from the foreign language text.

Having thus described my invention I claim:

1. Apparatus for assisting the learning of foreign language to a reader having fluency in a familiar language, comprising:

a media imprinted with a plurality of lines of text in the foreign language with ink of a first color, and a plurality of lines of text constituting a translation of the foreign text in the familiar language imprinted on the media with each line of the familiar language translation associated with an equivalent line in the foreign text; and eyeglasses adapted to be worn by the reader incorporating lenses having two sections, a first section adapted to pass electro-magnetic radiation reflected from the ink in which the foreign language is imprinted and to block radiation reflected from the ink in which the familiar language is imprinted and a second section adapted to pass radiation reflected from the ink in which the familiar language is imprinted, whereby the user may shift his gaze relative to the media so as to view either the foreign language text or the familiar language text.

2. The apparatus of claim 1 in which the eyeglasses have lens with the first sections forming the upper portion of each lens and the second section forming the lower portion of each lens.

3. Apparatus for assisting the learning of foreign language to a reader having fluency in a familiar language, comprising:

a media imprinted with a plurality of lines of text in the foreign language with ink of a first color, and a plurality of lines of text constituting a translation of the foreign text in the familiar language imprinted on the media with each line of the familiar language translation associated with an equivalent line in the foreign text; and filter means for reading either the foreign or familiar text comprising a transparent bookmark having a length substantially equal to the length of the imprinted text lines and having a width allowing it to be placed over at least a single line of text at a time, the filter having an upper section extending the full length of the filter tinted so as to pass light from a first of the imprinted texts and block light from the second, and lower section tinted so as to pass light from the second text and block light from the first.

4. The apparatus of claim 3 in which each line of foreign text and its associated line of familiar text are superimposed.

5. The apparatus of claim 1 in which each line of foreign text and its associated line of familiar text are superimposed.

* * * * *